June 6, 1933. K. J. TOBIN ET AL Re. 18,858

CAR DOOR CONSTRUCTION

Original Filed Oct. 13, 1927 5 Sheets-Sheet 1

~INVENTORS~
KENNETH J. TOBIN
WILLIAM W. DARROW

By~ Samuel Reese
ATTY.

June 6, 1933. K. J. TOBIN ET AL. Re. 18,858

CAR DOOR CONSTRUCTION

Original Filed Oct. 13, 1927 5 Sheets-Sheet 2

~INVENTORS~
KENNETH J. TOBIN
WILLIAM W. DARROW

By~ Samuel Reese
ATTY.

June 6, 1933. K. J. TOBIN ET AL. Re. 18,858

CAR DOOR CONSTRUCTION

Original Filed Oct. 13, 1927 5 Sheets-Sheet 3

INVENTORS
KENNETH J. TOBIN
WILLIAM W. DARROW
By Samuel Reese
ATTY.

CAR DOOR CONSTRUCTION
Original Filed Oct. 13, 1927 5 Sheets-Sheet 4
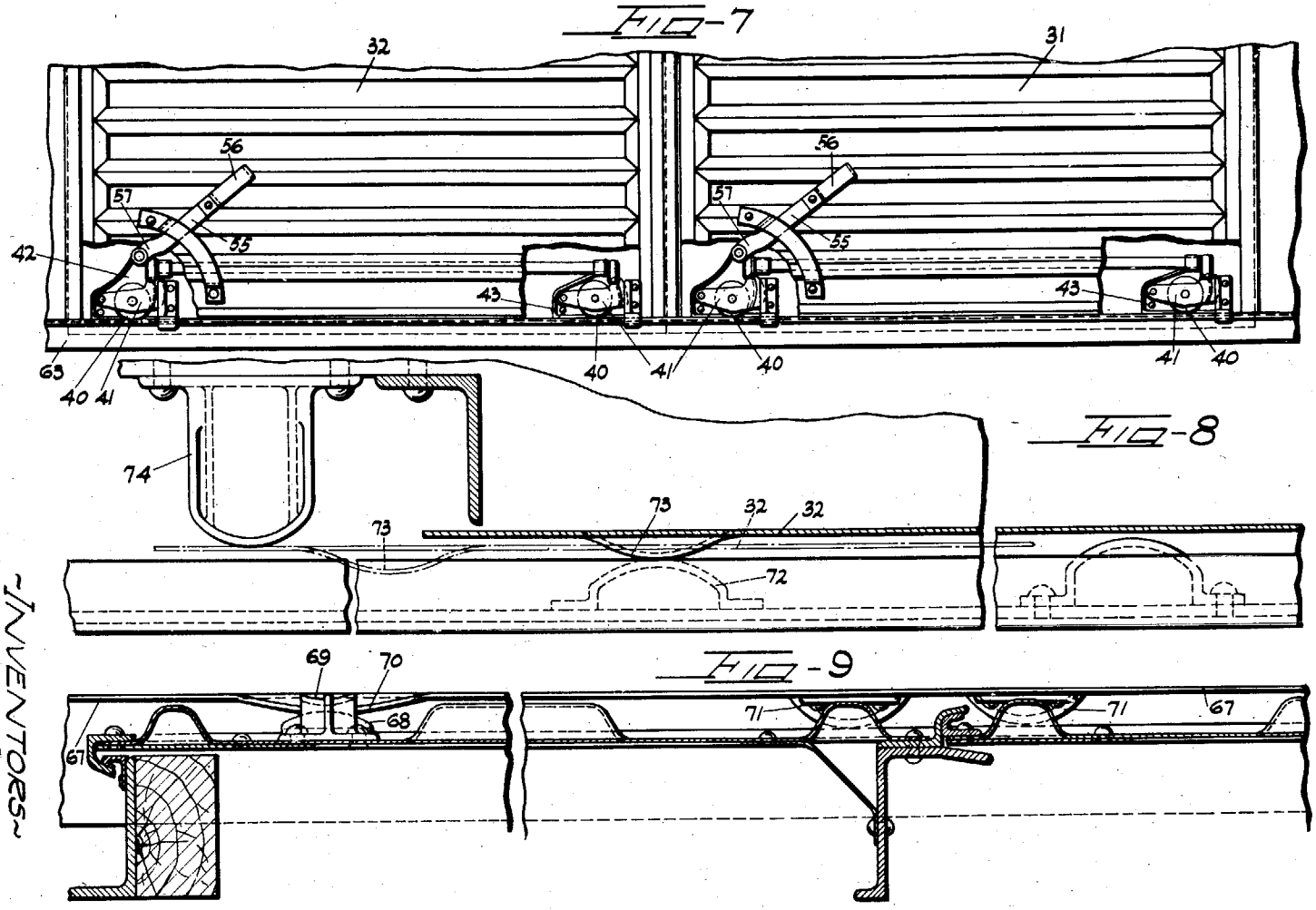
~INVENTORS~
KENNETH J. TOBIN
WILLIAM W. DARROW
By~ Samuel Reese
ATTY June 6, 1933. K. J. TOBIN ET AL Re. 18,858
CAR DOOR CONSTRUCTION
Original Filed Oct. 13, 1927 5 Sheets-Sheet 5
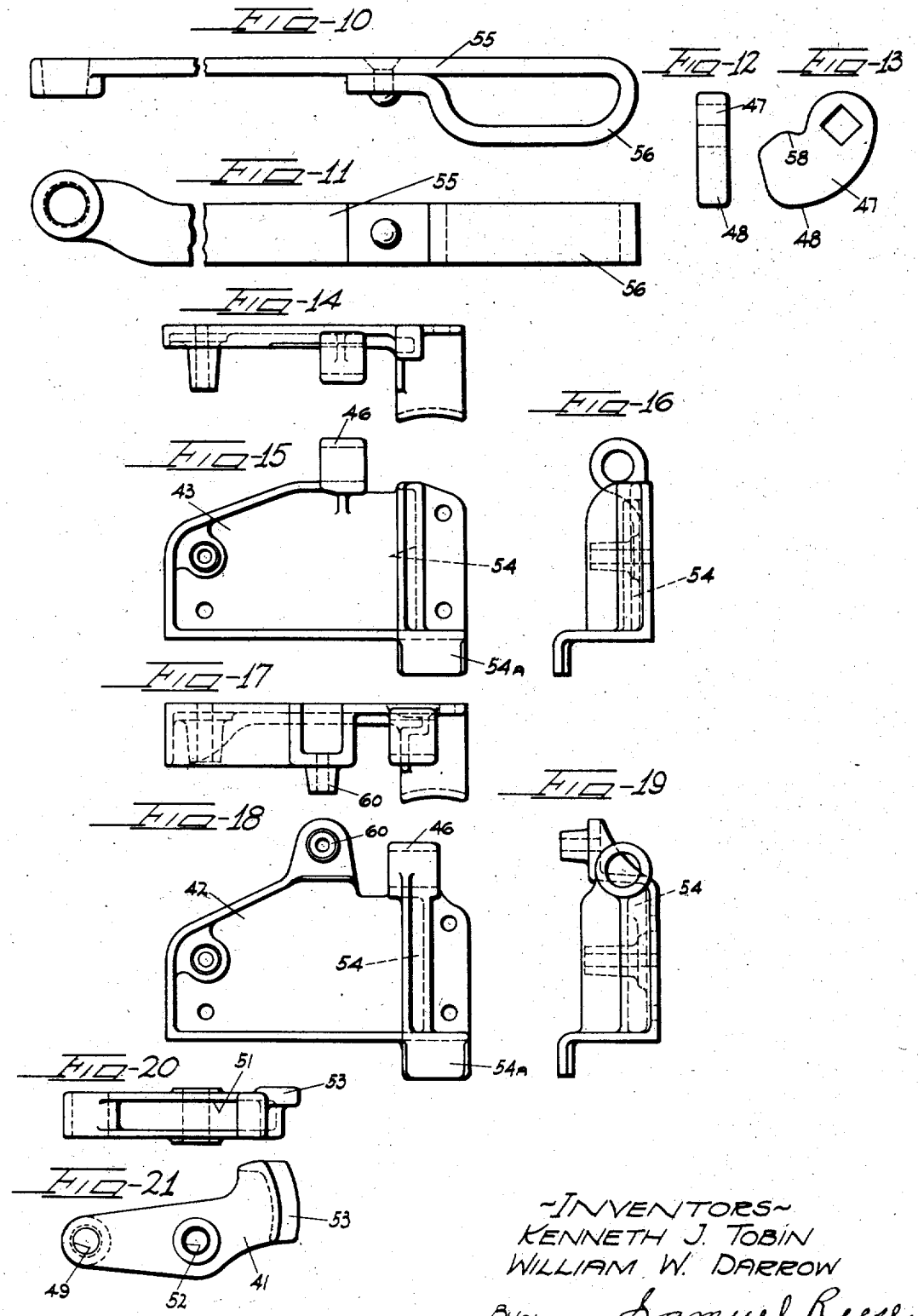
~INVENTORS~
KENNETH J. TOBIN
WILLIAM W. DARROW
By~ Samuel Reese
ATTY.

Reissued June 6, 1933 Re. 18,858

UNITED STATES PATENT OFFICE

KENNETH J. TOBIN AND WILLIAM W. DARROW, OF CHICAGO, ILLINOIS, ASSIGNORS TO CAMEL COMPANY, OF CHICAGO, ILLINOIS, A CORPORATION OF ILLINOIS

CAR DOOR CONSTRUCTION

Original No. 1,865,222, dated June 28, 1932, Serial No. 225,873, filed October 13, 1927. Application for reissue filed March 17, 1933. Serial No. 661,292.

The present invention relates to car door construction.

More particularly the present invention relates to sliding doors such as are used in railway house cars. The present invention has been illustrated and will be described in connection with cars having double sliding doors for providing a doorway of extraordinary width to be used when the car is to be used with lading of extra large dimensions. Such cars are commonly termed automobile cars. It will be understood as the description proceeds, however, that the invention is not limited to the type of car known as automobile car, but is equally adaptable to other types of car in which the door has a sliding movement in opening and closing.

The present invention contemplates a construction in which the door or doors may be moved upon rollers, but which at other times may rest upon a flat surface independently of said rollers.

A further object is to provide a sliding door having conveniently operable means for moving same upon rollers, which rollers are inoperative at times when it is not intended to communicate motion to said door.

A further object is to provide a sliding door which is capable not only of sliding movement longitudinally of the car for opening and closing the cooperating doorway, but is also capable of a small vertical movement, which door is provided with rollers operative when said door is in raised position but inoperative when said door is in lowered position, whereby said door may have secure frictional engagement with the relatively stationary parts of the car at any degree of door opening and whereby the danger of slamming is minimized.

A further object is to provide a sliding car door having means whereby it may be lifted upon rollers out of frictional engagement with the rigid parts of the car and whereby the door may be shifted laterally of the car a short distance, to increase the clearance over what is commonly provided in car construction between the car door and the car side.

A further object is to provide a car door construction having the advantage that the car door may be conveniently lifted upon rollers when it is desired to slide said door and which in its sliding movement will automatically change its position laterally of the car, whereby to give improved clearance over present practice.

Further objects will appear as the description proceeds.

Referring to the drawings

Figure 7 is a view similar in many respects to Figure 2, but showing the doors in their lowered positions;

Figure 8 is a sectional view taken along the plane indicated by the arrows 8—8 of Figure 1;

Figure 9 is a sectional view taken along the plane indicated by the arrows 9—9 of Figure 1;

Figures 10 and 11 are views of a lever such as used in the operation of the door lifting structure shown in Figure 5;

Figures 12 and 13 are views of a cam such as may be used in the operations of the door lifting structure shown in both Figures 5 and 6;

Figures 14, 15 and 16 are views of brackets such as used at the lower right hand portions of the doors shown in Figures 1, 2 and 3, which brackets are shown in assembled relationship with said doors in Figure 6;

Figure 5:
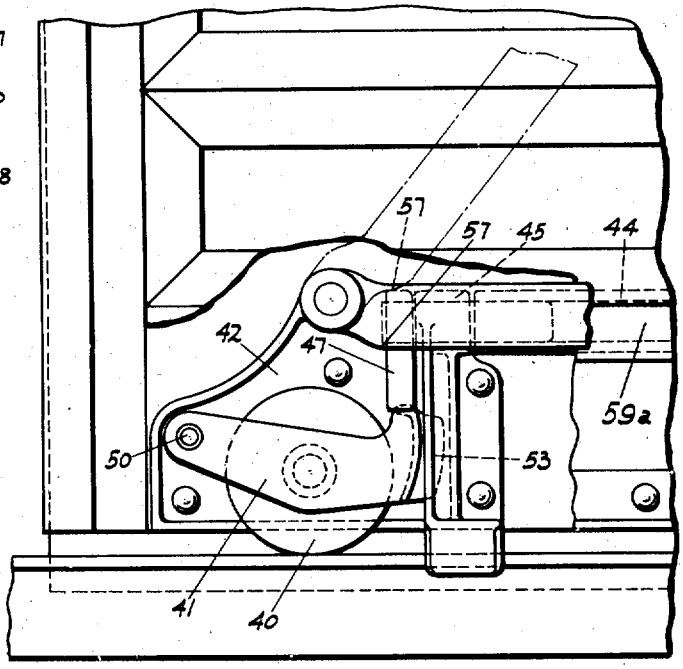
Figure 5 is a view on an enlarged scale showing a portion of the door lifting means associated with each of the doors shown in Figures 1, 2 and 3, the portion of the door lifting structure shown in Figure 5 being that represented at the lower left hand portion of each of the two doors shown in said figures.
Figure 6:
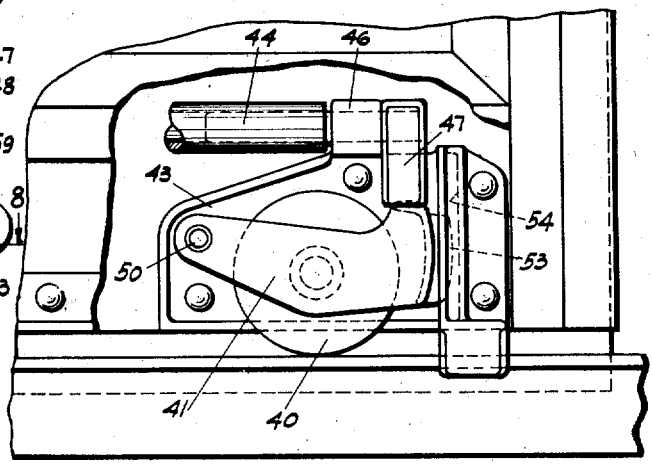
Figure 6 is a view complementary to Figure 5 and showing a portion of the door lifting means disposed at the lower right hand edge of each of the doors illustrated in Figures 1, 2 and 3.

Figures 17, 18 and 19 are views of the bracket used at the lower left hand edge of each of the doors, said bracket being shown in assembled relationship with a door in Figure 5; and Figures 20 and 21 are views of a roller retainer, which roller retainer is shown in assembled relationship with the corresponding door in Figures 5 and 6.

As noted above, the embodiment of the present invention chosen for illustration is an automobile car having two cooperating sliding doors, which, when both are opened, provides a doorway of extraordinary width. The side of the car is indicated by the numeral 30. The side 30 will ordinarily be provided with stakes and other members which are not illustrated but which must be cleared by the sliding door or doors in their opening and closing movements. It is for the purpose of providing sufficient clearance between the sliding door or doors and such stakes and the like that the door is so disposed as to be movable laterally of the car, as will presently be described.

The numeral 31 indicates one sliding door which may be termed a main door, and the numeral 32 indicates a sliding door which may be termed an auxiliary door. The auxiliary door is provided with the door jamb 33 (indicated in section in Figure 3), which door jamb is provided with the lip 34 for receiving the front edge angle 35 of the main door 31. The rear edge of the auxiliary door 32 is provided with the rear edge weather strip 36 adapted to cooperate with a weather strip associated with the relatively stationary door jamb, which jamb is indicated as a whole by the numeral 37. The rear edge of the main door 31 is provided with the rear edge angle 38 adapted to cooperate with a weather strip associated with the relatively stationary door jamb 39. Means are provided for lifting each of the doors 31 and 32 vertically and to carry said doors upon rollers, whereby said doors may be readily moved longitudinally of the car. At such times as the doors are in their lowermost positions, they rest solidly upon relatively fixed portions of the car, whereby the danger of accidental sliding movement is minimized.

Figure 4:
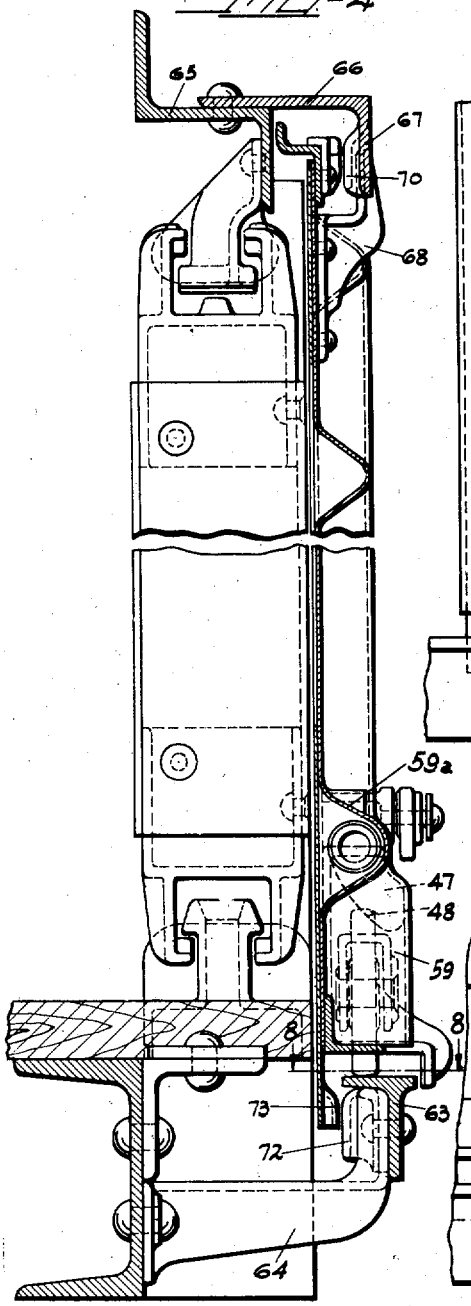
Figure 4 is a vertical sectional view taken along the plane indicated by the arrows 4—4 of Figure 1.

When the auxiliary door 32 is in closed position, the door jamb 33 thereof will be in secure latching relationship with portions rigid with the side sill and side plate of the car, whereby said sliding door 32 will be rigidly held in its home position. The present invention also contemplates structure whereby the door jamb 33 when in its home position will securely tie the side sill and side plate together, holding same against spreading. The construction referred to is illustrated in Figure 4, but is not claimed in detail in this application. Said subject matter is incorporated in another application of the present applicants.

As shown in Figures 1, 2, 5, 6 and 7, the doors 31 and 32 are provided adjacent to their front and rear edges with rollers, each of which is indicated by the numeral 40. Each of the rollers 40 is disposed within a roller retainer 41, which rollers retainers are pivoted to the doors adjacent to the forward and rear edges thereof through the medium of brackets, to be referred to hereinafter. Means are contemplated for exerting a downward movement upon the free extremities of the pivoted roller retainers 41—41, which action will have the effect of lifting the doors from frictional engagement with the rigid parts of the car, whereby said doors will be carried by said rollers 40—40. Said retainers, therefore, constitute levers of the first order.

The brackets for carrying the pivoted roller retainers 41—41 are identical at the left hand lower corners of each of the doors 31 and 32, said brackets being indicated by the numeral 42. Likewise, the brackets for carrying the roller retainers 41—41 at the lower right hand edge portions of the doors 31 and 32 are identical, said last mentioned brackets being indicated by the numerals 43—43. The numeral 44 indicates a longitudinally extending rotatable rod extending from the bracket 42 to the bracket 43 associated with each of the doors. Said rod 44 is journaled adjacent to each of its extremities in bearings 45 and 46 of the brackets 42 and 43, respectively. Each extremity of each rod 44 is provided with a squared portion for the reception of a cam member 47, best shown in Figures 12 and 13. Each cam 47 is provided with a camming surface 48 adapted to engage the swinging extremity of the corresponding roller retainer 41, whereby to exert a downward push upon the swinging extremity of the corresponding roller retainer and whereby to produce a reaction to raise the corresponding door 31 or 32. Each roller retainer 41—41 is provided with a bearing portion 49 for the reception of a pin 50, whereby the roller retainer 41 may be pivotally supported upon the corresponding bracket 42 or 43. Each roller retainer 41 is recessed intermediate of its length, as indicated by the numeral 51, for the reception of a roller 40. Each roller retainer is provided with an aperture 52 for the reception of a pin disposed within the side walls of the retainer 41, whereby the roller 40 is rotatably mounted within the retainer 41. The swinging extremity of each retainer 41 is provided with a lip 53 adapted to slide within a corresponding recess 54 in the corresponding bracket 42 or 43. By reason of the sliding engagement of the lip 53 and the recess 54, swinging movement of the retainer 41 transversely of the car is prevented, though swinging movement in a vertical plane is permitted. Each bracket 42 and 43 is provided with a downwardly extending flange or lip 54—A adapted to limit the inward swing of the bottom portion of the corresponding door. In order to communicate rotary movement to the rotatable rod 44, a lever 55 is provided swingingly mounted upon each of the brackets 42—42. Said levers 55—55 are provided with the hand grips 56 and with the abutment portions 57—57, which abutment portions 57—57 are adapted to engage the upper surfaces 58 of the cams 47. It will be clear without detailed explanation that the downward swinging movement of either of the hand levers 55 will result in a clockwise movement of the corresponding roller retainer 41 associated with the bracket 42 (see Figure 5), which movement will be accompanied by a movement of rotation of the rod 44, which will communicate a similar clockwise movement to the roller retainer 41 associated with the bracket 43 (see Figure 6). Clockwise movements of the two roller retainers 41—41 associated with the two brackets 42 and 43 will, of course, communicate a lifting movement to the corresponding door, whereby to lift said door from the position shown in Figure 7 to the position shown in Figure 2.

Figure 1:
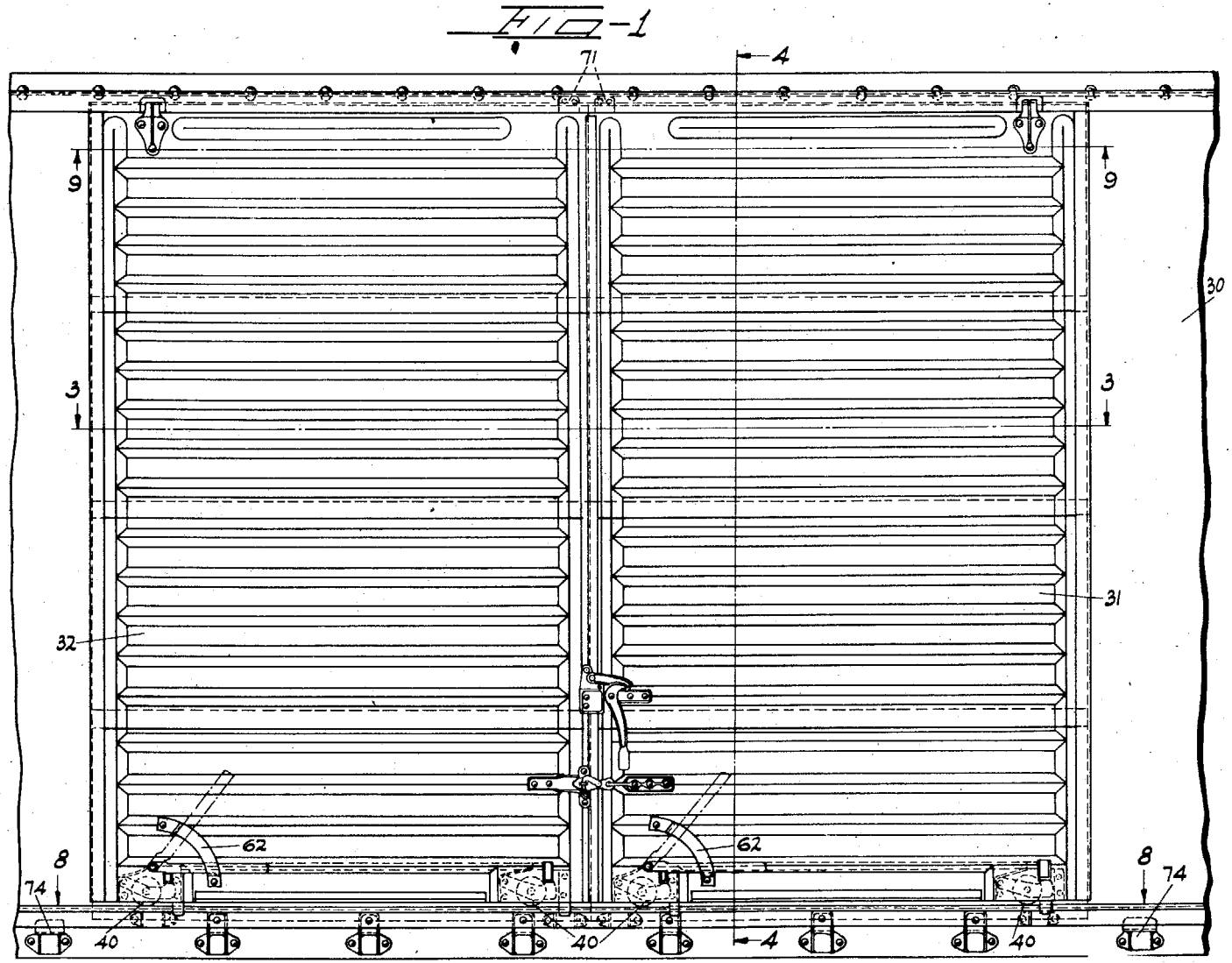
Figure 1 is a view in side elevation of part of the side of a railway house car, an automobile car being chosen for illustration.
Figure 2:
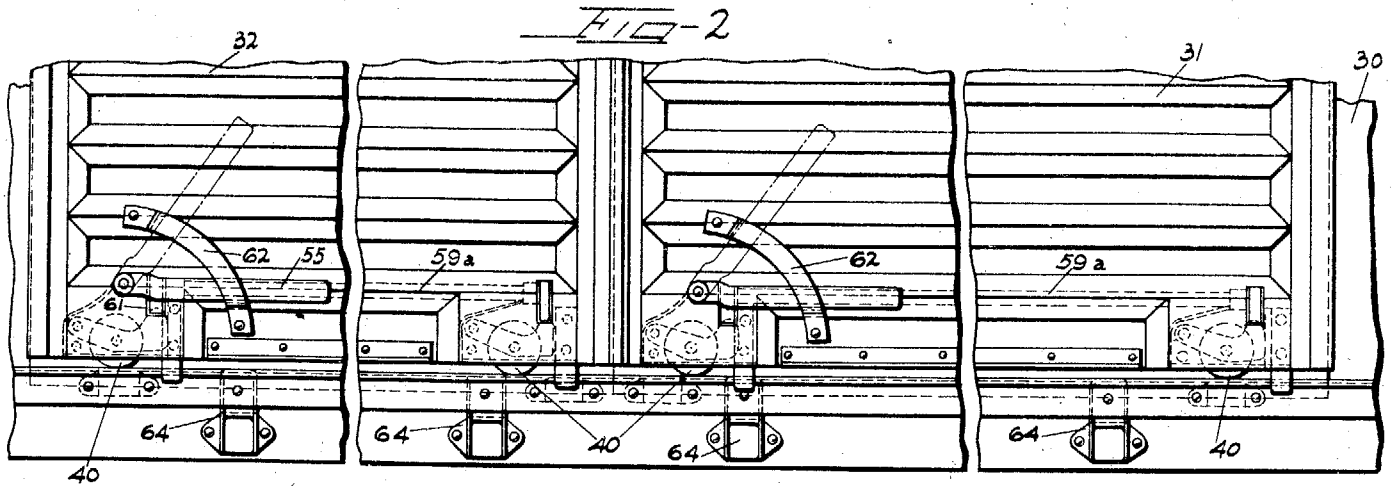
Figure 2 is a fragmentary view illustrating on an enlarged scale part of the construction shown in Figure 1.
Figure 3:
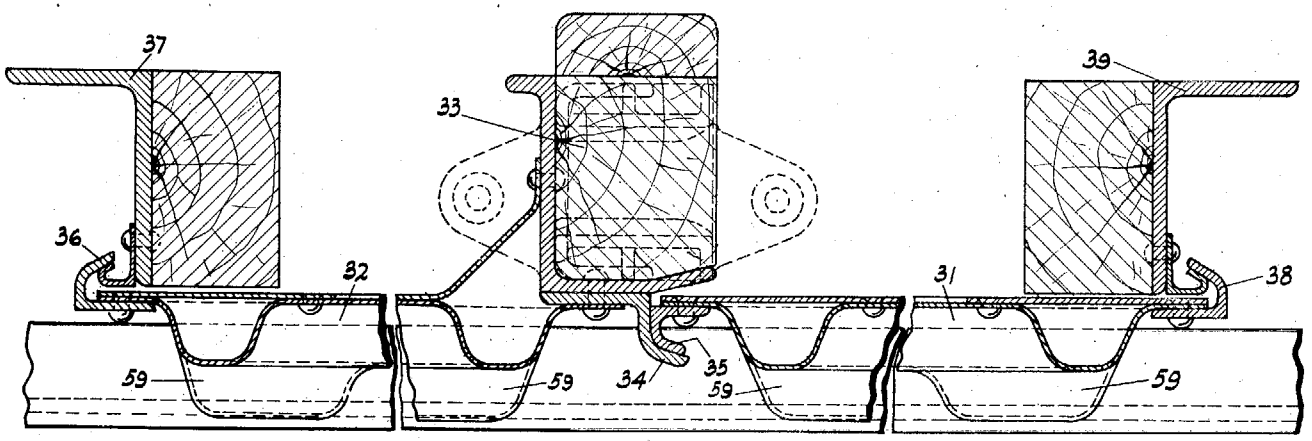
Figure 3 is a horizontal sectional view taken along the plane indicated by the arrows 3—3 of Figure 1.

Each of the brackets 42 and 43 and each of the rods 44 associated with each of the doors 31 and 32 are preferably disposed inwardly of the outer sheathing of the corresponding door, and for this purpose the lower extremity of each of the doors 31 and 32 may be swedged outwardly, as indicated by the numerals 59 and 59*a* (see Figures 3 and 4). It will be observed from these figures of the drawings that this operation provides merging outwardly extending vertical and horizontal portions adapted to receive the brackets 42 and 43 and their connecting rod 44 whereby the sheathing stands in protective relationship to said brackets and, with the exception of their ends, to the rods as well. Each bracket 42 is provided with a stud 60 projecting through a corresponding hole in the outer sheathing of the door and the corresponding hand lever 55 is carried at the outer extremity of said stud 60. The swedged out portion 59 of the outer sheathing of the door is slotted, as indicated by the numeral 61, to permit access of the hand lever 55 to the corresponding cam member 47. A strap 62 may be provided on the outer wall of each of the doors for guiding the corresponding lever 55 in its swinging movements.

The rollers 40—40 are adapted to engage the track 63, which is supported from the side sill of the car by a plurality of brackets 64 (see Figure 4). When the doors are in their lowered positions, they rest flatwise upon the track 63. Such flatwise engagement of the doors with the track 63 has the result that the danger of accidental sliding of the doors is minimized regardless of the extent of door opening.

As mentioned above the present invention contemplates a structure in which each door is adapted to have a movement laterally of the car when said door is moved from its closed position longitudinally of the car to an open position. For the purpose of communicating the lateral movement referred to, guide means of novel conformation are provided adjacent to the top and bottom of each door. Secured to the side plate 65 (Figure 4) is the angle member 66, which provides the downwardly extending guide flange 67. Disposed upon the outside of each door adjacent to the top thereof are brackets 68 having portions overlying the guide flange 67. Carried by each door inside of the flange 67 are the abutments 69 (see Figures 4 and 9). Each abutment 69 is spaced from the corresponding portion of the bracket 68 a distance sufficient to more or less closely receive the guide flange 67. Said guide flange 67 is provided with indentures 70 (see Figures 4 and 9), which indentures are smooth curves bent inwardly of the plane of the remainder of the guide flange 67. It will be clear that as the corresponding door is moved longitudinally of the car, the upper portion of the door will be moved laterally. Carried by a rigid part of the car are a pair of abutments 71—71 adapted to engage the inner forward portions of the doors and limit lateral movement of the corresponding door inwardly of the car. Said abutments 71—71, it will be understood, are effective only when the doors are in or near closed position.

Each of the lips 54—A of the brackets 42 and 43 is adapted to overlie the outer edge of the track 63. When the door is in its innermost position laterally of the car, that is, when the door is in closed position, said lips 54—A will engage the outer edge of the track 63 more or less closely. The track member 63 carries a vertically disposed flange, and carried on the inner wall of said flange 63 at spaced regions are the abutments 72 adapted to engage outwardly swedged indentures 73 in the corresponding door when said door is in closed position. By reason of the engagement of the indentures 73 with the abutments 72, the lower portions of the doors will be held against shaking when said doors are in closed position. In order to positively move the lower portions of the doors outwardly, brackets 74—74 are provided (Figures 1 and 8), which brackets are carried upon rigid portions of the car body. Figure 8 shows a portion of the door 32, the closed position of said door being shown in full lines and the open position of said door being shown in broken lines. It will be noted that as the door 32 is swung to the left, that is—in an opening movement, the corresponding bracket 74 will engage the inner side of said door at the lower portion of said door, whereby to positively move same outwardly. At this time the indentures 73 will be out of abutting relationship with the abutments 72, whereby there will be no interference between said indentures and abutments.

From the above description it will be clear that the invention provides a simple construction in which the doors may rest slidably upon rigid portions of the car when it is intended that said doors shall remain still, whether in closed, partly open, or full open position. When it is desired to move said doors, it is a simple matter to exert a downward force upon the outer extremities of the hand levers 55 and at the same time to communicate a pulling movement to the doors, whereby the doors will be given a lifting movement, and will be carried upon the rollers 40—40 and whereby the doors will be given a sliding movement to open same. Not only will the above described operation of the hand levers 55—55 accomplish the movements upwardly and longitudinally of the car, but by reason of the guiding arrangement between the guide flange 67 and the cooperating parts attached to the door, the upper portion of the corresponding door will be moved laterally, whereby to give all the clearance necessary in practice for sliding movement of the door. Moreover, the lower portion of the door will be moved outwardly by reason of the engagement of the inner wall of the lower portion of the door with the corresponding abutment 74.

The present invention presents the further advantage that it affords an opportunity to use a very efficient latching arrangement, which will be described and claimed in a copending application, which latching arrangement relies upon the lifting and lowering of the door or door jamb whereby to cooperate with abutment means associated with the side sill or the side plate, or preferably both of said members.

Though a preferred embodiment of the present invention has been described in detail, many modifications will occur to those skilled in the art. It is intended to cover all such modifications as fall within the scope of the appended claims.

What is claimed is—

1. In combination, in a car, a horizontally slidable door, a track member, said door having a portion adapted to lie flatwise upon a fixed part of said car to impart the weight of said door thereto, rollers disposed adjacent to a horizontal edge and to the two vertical edges of said door engaging said track member, retainers for said rollers, said retainers being pivoted to said door and comprising levers of the first order, and operating means for the swinging extremities of said levers, said edge of said door being capable of movement transversely of said car whereby said door in its sliding movement may have clearance relative to the side of said car, and mechanism for guiding said door in said movement transversely of said car toward and away from said side of said car.

2. In combination, in a car, a horizontally slidable door, a track member, said door having a portion adapted to lie flatwise upon a fixed part of said car to impart the weight of said door thereto, rollers disposed adjacent to a horizontal edge and to the two vertical edges of said door, said rollers engaging said track member, retainers for said rollers, said retainers being pivoted to said door and comprising levers of the first order, and operating means for the swinging extremities of said levers, and means connecting said operating means to cause said operating means to operate in unison, said edge of said door being capable of movement transversely of said car whereby said door in its sliding movement may have clearance relative to the side of said car, and mechanism for guiding said door in said movement transversely of said car toward and away from said side of said car.

3. In combination, in a car, a sliding door, a track member, said door having a portion adapted to lie flatwise upon a fixed part of said car to impart the weight of said door thereto, rollers disposed upon said track member adjacent to the forward and rear edges of said door, said rollers engaging said track member, retainers for said rollers pivoted to said doors and comprising levers of the first order, and means for exerting a downward force upon the swinging extremities of said levers, a handle for operating said means, said handle having a path of movement parallel with said door.

4. In combination, in a car, a sliding door, a track member, said door having a portion adapted to lie flatwise upon a fixed part of said car to impart the weight of said door thereto, a pair of unit assemblies carried by said door, each of said unit assemblies comprising a roller disposed upon said track member, a retainer for said roller pivoted to its corresponding unit assembly, means for exerting a downward force upon the swinging extremities of said retainers for lifting said door upon said rollers, means connecting said first mentioned means together whereby said first mentioned means operate in unison, and an operating member for said first mentioned means mounted to swing in a plane parallel with said door.

5. In combination, in a car, a sliding door, a track member, said door having a portion adapted to lie flatwise upon a fixed part of said car to impart the weight of said door thereto, a pair of unit assemblies mounted upon said door, each of said assemblies comprising a bracket, a roller retainer pivotally supported by said bracket, and a roller engaging said track member and carried by said retainer, said retainer and said bracket having cooperating abutting portions for constraining said retainer to movement in a single plane relative to said door.

6. In combination, in a car, a sliding door, a track member, said door having a portion adapted to lie flatwise upon a fixed part of said car to impart the weight of said door thereto, a pair of unit assemblies mounted upon said door, each of said assemblies, comprising a bracket, a roller retainer pivotally supported by said bracket, and a roller engaging said track member and carried by said retainer, said retainer and said bracket having cooperating abutting portions for constraining said retainer to movement in a single plane relative to said door, said retainer comprising a lever of the first order, and a member positioned to exert a downward force upon the swinging extremity of said lever, and an operating member movable in a plane parallel with said door for exerting force upon said member.

7. In combination, a door, a track member for supporting said door, said door being biased by gravity into engagement with said track member, rollers engaging said track member, levers carried by said rollers and swung about the axes of said rollers, extremities of said levers being disposed in position to exert a lifting force to said door, and means for exerting pressure upon the other extremities of said levers whereby to swing same about said rollers as fulcrums for lifting said door, said means including an operating member having a path of movement parallel with said door, whereby in a single movement a door lifting and a door opening movement may be communicated to said door.

8. In combination, a track member, a door, rollers, lever members pivoted to said door for carrying said rollers, means for exerting force upon said lever members to lift said door upon said rollers, guide means cooperatively associated with the top and bottom edges of said doors for guiding said door laterally of said car away from said car as said door is moved longitudinally of said car in the opening movement of said door.

9. In combination, a track member, a door, rollers, lever members pivoted to said door for carrying said rollers, means for exerting force upon said lever members to lift said door upon said rollers, guide means cooperatively associated with the top and bottom edges of said doors for guiding said door laterally of said car away from said car as said in a single movement a door lifting and a door is moved longitudinally of said car, said guide means including members for holding said door against lateral shake regardless of the extent of door opening.

10. In combination, a door, a track member for supporting said door, said door being biased by gravity into engagement with said track member, rollers engaging said track member, levers for carrying said rollers, said levers being of the first order, means for exerting pressure upon said levers whereby to swing same about said rollers as fulcrums for lifting said door, a rotatable member having its axis parallel with said door for simultaneously operating said means, and an operating member for said rotatable member, said operating member having a path of movement parallel with said door whereby door opening movement may be communicated to said door.

11. In a car, a sliding door, a track member, said door having a portion adapted to lie flatwise upon a fixed part of said car to impart the weight of said door thereto, a pair of brackets mounted upon said door, a roller retainer pivotally supported by each of said brackets, and a roller within each of said roller retainers engaging said track member, each of said brackets and its corresponding retainer having cooperating abutting portions for constraining said retainer to movement in a single plane relative to said door.

12. In combination, in a car, a door, a track member, said door having a portion adapted to lie flatwise upon a fixed part of said car to impart the weight of said door thereto, rollers disposed adjacent to an edge of said door and engaging said track member, levers for carrying said rollers, said levers being swung about the axes of said rollers and disposed in position to exert a lifting force to said door at extremities of said levers, means for exerting pressure upon the other extremities of said levers whereby to swing same about said rollers as fulcrums for lifting the door, said edge of said door being capable of movement transversely of said car whereby said door in its sliding movement may have clearance relative to the side of said car, and mechanism for guiding said door in said movement transversely of said car toward and away from said side of said car.

13. In combination, in a car, a sliding door, the lower portion of said door being swedged outwardly, a track member, said door having a portion adapted to lie flatwise upon a fixed part of said car to impart the weight of said door thereto, rollers disposed upon said track member adjacent to the forward and rear edges of said door, retainers for said rollers pivoted to said doors and comprising levers of the first order, and means for exerting a downward force upon the swinging extremities of said levers, said rollers and the retainers therefor being disposed in said outwardly swedged portion of said door, a handle for operating said means, said handle having a path of movement parallel with said door.

14. In combination, in a car, a horizontally slidable door, outwardly swedged means provided on said door adjacent the lower corners thereof, a track, said door having a portion adapted to lie upon said track to impart the weight of said door thereto, a lift device including a roller engaging said track disposed in each of said swedged means, a member engageable with said devices for imparting simultaneous movement thereto, said member being positioned in outwardly swedged means extending between and communicating with said first mentioned means, and a lever for operating said member.

15. In combination, in a car, a horizontally slidable door, said door adjacent the lower corners thereof being pressed outwardly, a track, said door having a portion adapted to lie upon said track to impart the weight of said door thereto, a lift device for said door including rolling means engaging said track disposed in each of said outwardly pressed portions, an outwardly extending horizontal corrugation formed in said door extending between and merging with said outwardly pressed portions, a member disposed in said corrugation engageable with said lift devices for imparting movement thereto and lever means for operating said member.

16. In combination, in a car, a horizontally slidable door, said door adjacent the lower corners thereof being pressed outwardly, a track, said door having a portion adapted to lie upon said track to impart the weight of said door thereto, a lift device for said door including rolling means engaging said track disposed in each of said outwardly pressed portions, a member carried by said door engageable with said lift devices for imparting simultaneous movement thereto and a lever for operating said member.

17. In combination, in a car, a sliding door, a track, said door having a portion adapted to lie upon said track to impart the weight of said door thereto, a lift device including roller means engaging said track carried by said door adjacent each lower corner thereof, a horizontal corrugation formed in said door, a member disposed in said corrugation engageable with said lift devices for imparting simultaneous movement thereto, and a lever for operating said member.

18. In combination, in a car, a horizontally slidable door, outwardly swedged means provided on said door adjacent the lower corners thereof, a track, said door having a portion adapted to lie upon said track to impart the weight of said door thereto, a lift device including a roller engaging said track disposed in each of said swedged means, a member engageable with said devices for imparting simultaneous movement thereto, said member being positioned in outwardly swedged means extending between and communicating with said first mentioned means, slots provided in said first mentioned means, the ends of said member extending outwardly through said slots and a lever engageable with one of said ends for operating said member.

19. In combination, in a car, a horizontally slidable door, swedged means provided on said door adjacent the lower corners thereof, a track, said door having a portion adapted to lie upon said track to impart the weight of said door thereto, a lift device including a roller engaging said track disposed in each of said swedged means, a member engageable with said devices for imparting simultaneous movement thereto, said member being positioned in swedged means extending between and communicating with said first mentioned means and a lever for operating said member.

Signed at Chicago, Illinois, this 15th day of March, 1933.

KENNETH J. TOBIN.
WILLIAM W. DARROW.